Dec. 4, 1962  F. B. MacDONALD  3,066,569
LINE-OF-SIGHT ILLUMINATION AND VIEWING INSTRUMENT
Filed Dec. 15, 1958  3 Sheets-Sheet 1

INVENTOR
Francis B. MacDonald
BY Sughrue and Rothwell
ATTORNEYS

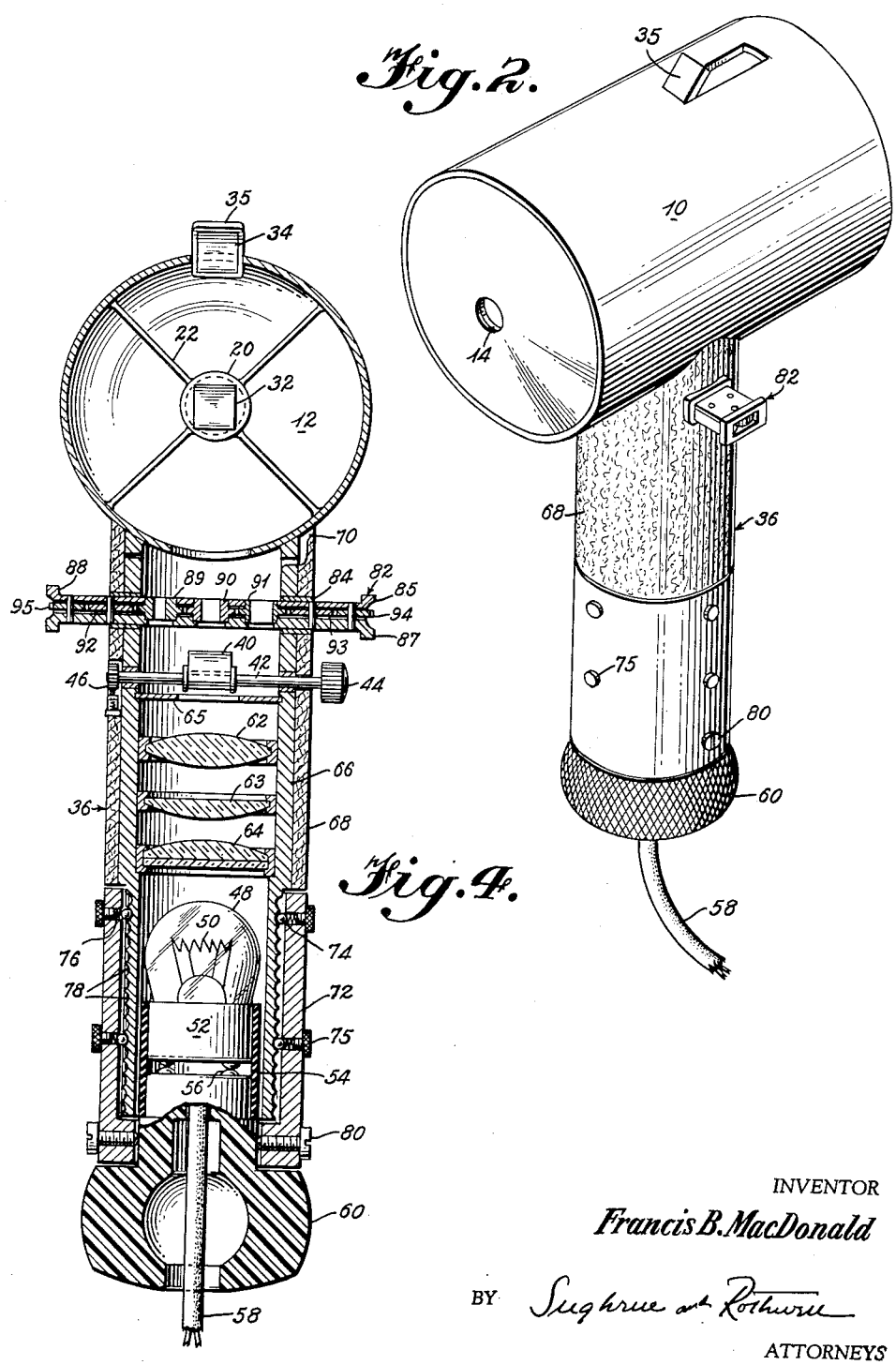

Dec. 4, 1962  F. B. MacDONALD  3,066,569
LINE-OF-SIGHT ILLUMINATION AND VIEWING INSTRUMENT
Filed Dec. 15, 1958  3 Sheets-Sheet 3

INVENTOR
*Francis B. MacDonald*
BY *Sughrue and Rothwell*
ATTORNEYS 3,066,569
LINE-OF-SIGHT ILLUMINATION AND VIEWING
INSTRUMENT
Francis B. MacDonald, Livermore, Calif.
Filed Dec. 15, 1958, Ser. No. 780,590
3 Claims. (Cl. 88—1)

This invention relates to improvements in optical instruments, and more particularly relates to a reflecting objective image-forming optical instrument having line-of-sight illumination incorporated therein.

Various optical instruments are known which incorporate a source of illumination for lighting an object to be inspected. However, the known instruments provide side or angled illumination, that is, illumination by light rays that are disposed at an angle to the line of sight. For example, the common head mirror worn by a physician, which mirror is substantially spherical with a hole in the center thereof, reflects light from a source to the object to be inspected, i.e., the patient. This type mirror directs rays of light upon the object at an angle to the line of vision. The use of side illumination for illuminating a surface by rays which are not parallel to the line of sight changes the texture of an image and if the image has a delicate texture not an entirely accurate picture will be obtained by the user of the instrument. This can be especially important in the diagnostic inspection of a human eye. It would be highly desirable if the operator of an optical instrument were able to look down a beam of light focused on the object. In other words, if the line of sight and beam of illumination were parallel or coinciding, the result would be most effective, and the texture of the image could be better observed. Therefore, it is the principal object of this invention to provide an optical instrument with line-of-sight illumination.

Reflecting image forming optical instruments of the Cassegrain or Burch type have certain advantages over refracting type image forming optical systems. Some of these advantages are the highly efficient light gathering powers and their lack of chromatic aberration. In this type of optical instrument the apparent line of sight extends through the reflecting objective mirror, and this feature makes this type of instrument susceptible to the incorporation of illumination means for illuminating an opaque object along the apparent line of sight. Hence, it is an object of this invention to provide a reflecting image forming optical instrument of the Cassegrain or Burch type with line-of-sight illumination.

The principal objects of this invention are accomplished by providing a reflecting objective type optical instrument, the instrument having convex and concave reflecting mirror surfaces facing each other with the convex mirror surface within the focal point of the concave mirror surface such that an object will be reflected through an aperture in the center of the concave mirror to form an image in a plane. This type of instrument is provided with means for directing a beam of illumination from behind the convex mirror to the object along the optical axis and hence along the apparent line of sight.

The source of illumination must be restricted in size so as not to cause a central obstruction. It must also be inside the focal point of the concave mirror and this is accomplished by placing it behind the convex reflecting mirror. Although any known means may be utilized as a source of illumination, it is a further object of this invention to provide a source of illumination which may be selectively directed along the line of sight or from the edge or both. Furthermore, the source of illumination can be in the form of a narrow slit of light which can be suitably rotated for illuminating the object and this rotating slit of light may be focused upon the subject from along a line of sight or from an angle with respect thereto.

Other objects and advantages of this invention will be pointed out in the following detailed description and claims, and illustrated in the accompanying drawings, which disclose, by way of example, the principles of this invention and the best mode which has been contemplated of applying these principles.

In the drawings:

FIG. 2 is a perspective view of an optical instrument employing the principles of this invention;

FIG. 4 is a sectional view taken along line 4—4 of FIG. 3; and

Figure 1:
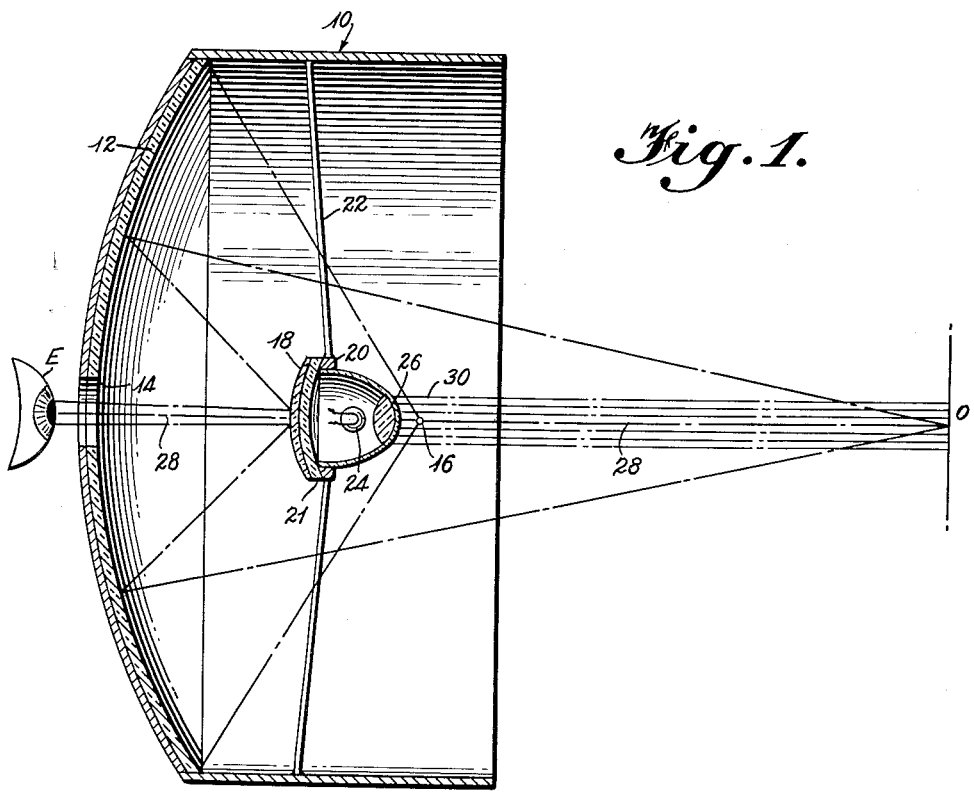
FIG. 1 is a schematic view showing a reflecting optical system and illumination means therefor which illustrate the principles of this invention.
Figure 5:
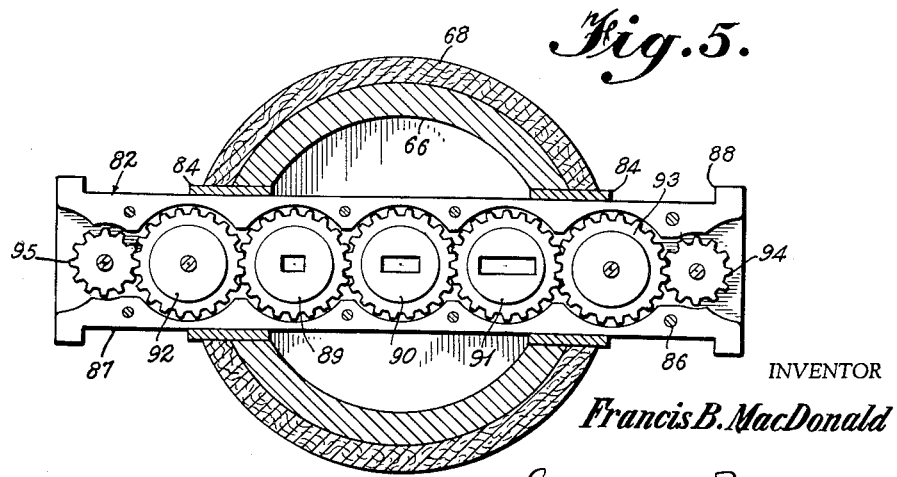
FIG. 5 is a sectional view taken along line 5—5 of FIG. 3.

Referring to FIG. 1, a housing or supporting structure 10 houses a substantially spherical concave reflecting mirror 12 having a viewing aperture 14 therein. A substantially spherical concave mirror 12 may have a focal point as indicated at 16. A convex reflecting mirror 18 faces the concave mirror 12 and is spaced along an optical axis therefrom. The position of mirror 18 is within the focal point 16 of the concave mirror. A suitable support 20 which is attached to housing 10 by strut member 22 carries an insulating pad 21 which in turn supports the convex mirror 18.

Any suitable light source 24 is provided behind the convex mirror and within the focal point 16 of the concave mirror 12. A light focusing means such as a condensing lens 26 provides a parallel beam of rays 30 from the light source 24 to illuminate an object 0. Thus the rays 30 from the source of illumination are parallel to the optical axis and the apparent line of sight 28. With this arrangement the source of illumination is parallel with the apparent line of sight and delicate textures of the object, which for example may be a human eye, will be apparent to an observer or examiner E whereas if the illumination were from the side, such delicate textures might be obscured.

Any suitable source of illumination may be used as long as this source of illumination is small enough to be positioned behind the convex mirror and between the convex mirror and the focal point of the concave mirror as illustrated in FIG. 1. Suitable sources of illumination which have been contemplated include not only incandescent lamps, but flash bulbs, ultra-violet light, carbon arc light, infra-red radiation, and radioactive energy suitably shielded, such as irradiated phosphorus, etc. In addition to these possible sources of light as well as others, one source of light could be reflected light, suitably controlled. An optical instrument utilizing controlled reflected light is illustrated in FIGS. 2 through 5.

Figure 3:
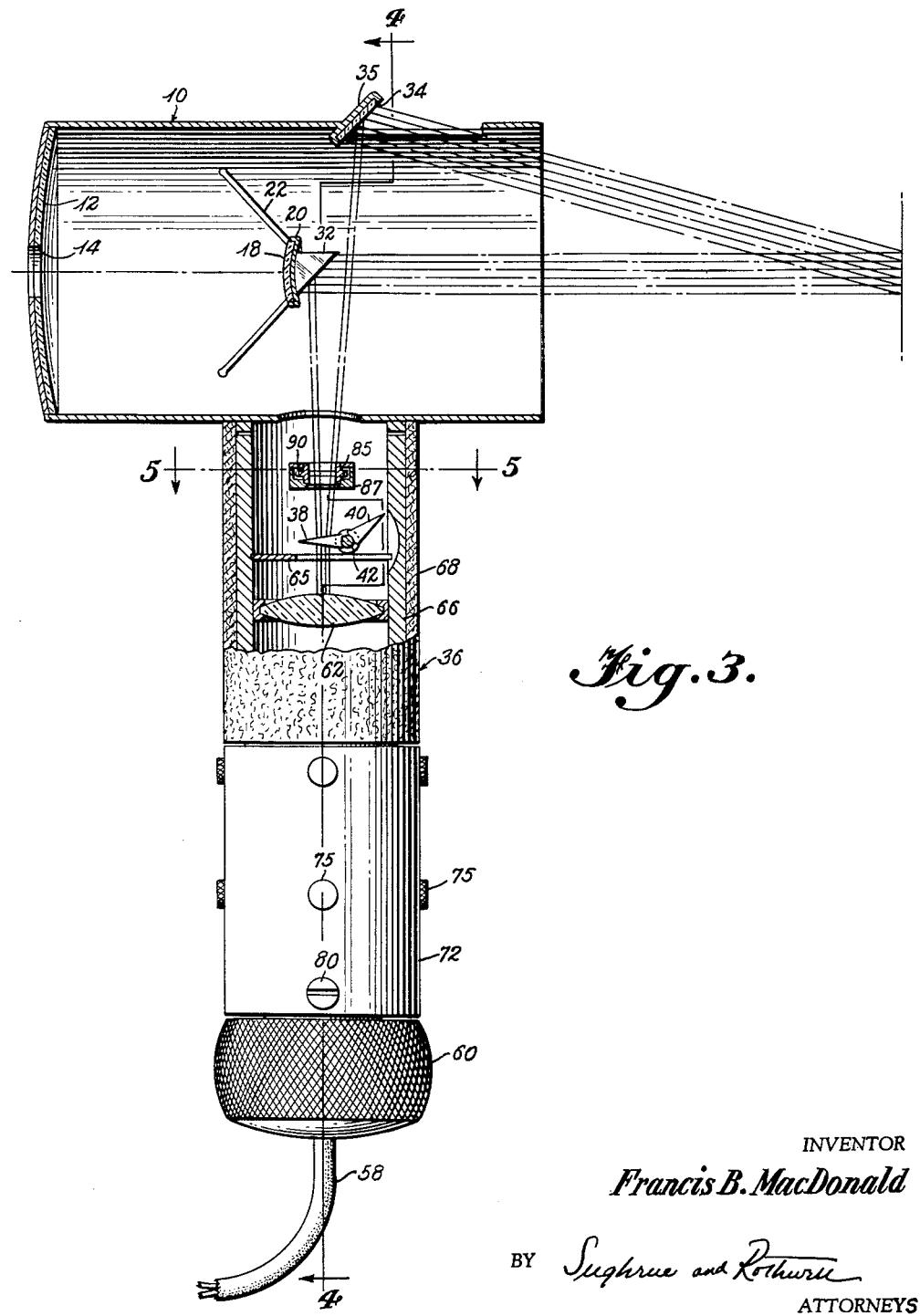
FIG. 3 is a side elevation view, partially in section, of the instrument shown in FIG. 2.

Referring to FIG. 3, a housing 10 has a concave reflecting mirror 12 with a viewing aperture 14 and a convex mirror 18 supported from member 20 by suitable struts 22 in a manner similar to that described in connection with FIG. 1. In order to furnish illumination for an object at the control of the instrument operator, which illumination may be either direct or side illumination or a combination of both, the instrument includes a direct illumination reflecting mirror 32 having a 45° reflecting surface thereon, and a side illumination reflecting mirror 34 supported from the housing 10 by a mirror support 35. One side of the housing 10 includes a suitable handle 36 which contains a source of light and the control means therefor.

For controlling the application of illumination there is provided a pair of prisms 38 and 40, which prisms are mounted on a shaft 42 extending through the handle. The prisms 38 and 40 are arranged on shaft 42 such that either one may be selectively interposed into a beam of light passing upward through the handle or neither of them may be interposed into this beam of light. As shown in FIG. 4, the prism shaft 42 includes an actuating knob 44 on one end thereof and a detent mechanism 46 on the opposite end thereof to stop the movement of the shaft in the position where the prisms will either direct the light in the manner required or not intercept the light beam.

The source of illumination is provided by a suitable light bulb 48 having a long rod-shaped filament 50, FIG. 4. The base of the bulb 52 fits within a suitable insulating sleeve 54 and has contacts thereon cooperating with contacts 56 which are in circuit with a suitable electric cord 58. The cord 58 passes outwardly through a suitable knob 60 on the bottom of the instrument. This knob may be hollow and it functions as the support for the light 48.

For directing the light from bulb 48 there is provided a convex lens system including lenses 62, 63, and 64 which provide a parallel beam of light emerging therefrom. Above the convex lens system there is a suitable light occluding diaphragm 65 for limiting the size of the beam. The handle 36 includes an inner tubular member 66 which supports the lenses 62, 63 and 64 as well as the diaphragm 65 and the prism assembly. Tubular member 66 may be covered with an insulating cover 68 of leather or the like. An air vent 70 may be provided through member 66 and cover 68.

A tubular cuff 72 is secured to the handle 60 by set screws 80. Cuff 72 is adjustably positioned on the tubular member 66 by means of balls 74 which are biased into grooves 78 on the lower end of tubular member 66 by springs 76 acting against screws 75. Thus, by moving the cuff 72 and handle 60 downwardly with respect to member 66, the light 48 will also be moved down to change its position and the illumination provided thereby. As shown in FIG. 4, the grooves 78 also allow the knob 60 to rotate the rod shaped filament 50 thereby providing a rotatably adjustable light source.

For the purpose of providing a narrow slit beam or other configuration of light beam which may be utilized as a source of illumination, there is provided a slide 82 containing suitable masks. The slide 82 slides on a bearing 84 in the handle 36. The slide 82 may include a two-ply housing consisting of a top ply 85, and a bottom ply 87, secured together by suitable pins 86, FIG. 5. Flanges 88 are provided on both ends of the slide 82 for butting against bearings 84 and limiting the movement of the slide in either direction. The slide carries a plurality of rotatable masking discs 89, 90 and 91 having geared peripheries which are in mesh with each other. Also in mesh with masking gear disks 89 and 91 are a pair of blank discs or gears 92 and 93, and these gears are in mesh with drive pinions 94 and 95 at the opposite ends of the slide.

In operation, the light 48 is energized from any suitable electric source through conductor 58 and the light emanating therefrom is focused into parallel rays by the lens system consisting of lenses 62, 63 and 64. The size of this light beam is controlled by diaphragm 65 and the beam then is selectively directed either by the absence of a prism 38, 40, or either one of these prisms. The light then passes through whichever one of the rotatable discs 89, 90 or 91, is interposed in its path and is selectively directed against either reflecting central mirror 32 or oblique side mirror 34 or both. For example, when there is no prism interposed in the beam of light, all the rays of light go directly to the central mirror 32 and provide central illumination of the object. Thus, the entire illumination of the object, provided by the instrument, is parallel to line of sight of the instrument. When the smaller angle prism 38 is interposed in the beam of light, the light rays are equally divided between the central reflecting mirror 32 and the oblique reflecting mirror 34, thus providing illumination of the object which is half direct and half from the side. For providing entirely side illumination of the object, the prism shaft 42 may be turned by means of handle 44 and the large angle prism 40 may be interposed in the beam of light, thus directing the beam entirely to the side angle reflecting mirror 34. Furthermore, if it was desired to mask or rotate the beam of illumination, either one of the drive pinions 94, 95 may be rotated to rotate the masking discs 89, 90 and 91, and whichever disc is interposed in the beam of light will mask and rotate the transmitted beam.

Although the illuminated optical instrument disclosed herein is especially useful for the examination of a human eye by a physician, it is not limited thereto, but may be equally useful to jewelers, photographers, law enforcement officers, and other skilled technicians.

The term "substantially spherical" as used herein in connection with the concave and convex mirrors also includes parabolic mirrors such as used in a conventional Cassegrain system and other mirrors which may be a deviation from a true spherical reflecting surface.

While there have been shown and described and pointed out the fundamental novel features of this invention as applied to the preferred embodiment, it will be undstood that various omissions and substitutions and changes in the form and details of the device illustrated and its operation may be made by those skilled in the art without departing from the spirit of the invention. Various modifications and changes which are readily apparent would be the operation of the device by a battery, incorporation of two similar devices into a binocular-type instrument, adding an eyepiece at the viewing aperture, the incorporation of the lenses into the light source, and the provision of a two filament light source which may be selectively energized to switch the filaments to direct the beam of light to either a central or side mirror for selective illumination. These modifications are only suggestive and are not intended to be all-inclusive. It is the intention, therefore, to be limited only as indicated by the scope of the following claims and reasonable equivalents thereof.

What is claimed is:

1. In an optical instrument for providing line-of-sight illumination the combination comprising;
    a concave reflecting mirror having a central viewing aperture therein;
    a convex reflecting mirror disposed at a distance from, and in facing relation to said concave mirror along the optical axis thereof, said convex mirror residing between the concave mirror and the focal point of the concave mirror;
    a radiation reflecting means disposed along the optical axis of said concave mirror and residing between said convex mirror and the focal point of said concave mirror;
    a first housing structure supporting said mirrors in their relative positions, said housing having an aperture which is adjacent to said reflecting means;
    a second housing structure affixed to said first housing structure and extending generally perpendicular to the optical axis of said concave mirror, said second housing structure surrounding the aperture in said first housing structure at their point of juncture;
    a source of radiation in said second housing structure disposed to direct a beam of radiation through the aperture in said first housing structure which impinges upon said radiation reflecting means which in turn reflects the beam along the optical axis of said concave mirror and in a direction opposite to said mirrors;
    a convex lens system mounted in said second housing structure between said source of radiation and said first housing structure whereby the radiation from said source enters said first housing structure in a beam of parallel rays; and masking means slidably mounted in said second housing structure between said lens system and said first housing structure and disposed to intercept the beam of radiation to prevent the further transmission of all but a desired portion thereof, said masking means having a plurality of positions transverse to said second housing each of which is effective to prevent the further transmission of a different portion of the beam.

2. In an optical instrument for providing line-of-sight illumination the combination comprising;

a concave reflecting mirror having a central viewing aperture therein;

a convex reflecting mirror disposed at a distance from, and in facing relation to said concave mirror along the optical axis thereof, said convex mirror residing between the concave mirror and the focal point of the concave mirror;

a radiation reflecting means having no dimension perpendicular to the optical axis greater than said convex mirror disposed along the optical axis of said concave mirror and residing between said convex mirror and the focal point of the concave mirror;

a first housing structure supporting said mirrors in their relative positions, said housing having an aperture which is adjacent to said reflecting means;

a second housing structure affixed to said first housing structure and extending generally perpendicular to the optical axis of said concave mirror, said second housing structure surrounding the aperture in said first housing structure at their point of juncture;

a source of radiation in said second housing structure disposed to direct a beam of radiation through the aperture in said first housing structure which impinges upon said radiation reflecting means which in turn reflects the beam along the optical axis of said concave mirror and in a direction opposite to said mirror; and lens means disposed within said second housing structure between said source of radiation and the aperture in said first housing structure wherein said lens means focuses the radiation into a beam of parallel rays.

3. In an optical instrument the combination comprising;

a concave reflecting mirror having a central viewing aperture therein;

a convex reflecting mirror disposed at a distance from, and in facing relation to said concave mirror along the optical axis thereof, said convex mirror residing between the concave mirror and the focal point of the concave mirror;

a first radiation reflecting means disposed along the optical axis of said concave mirror and residing between said convex mirror and the focal point of said concave mirror;

a first housing structure supporting said mirrors and reflecting means in their relative positions, said housing having an aperture which is adjacent to said first reflecting means;

a second radiation reflecting means mounted to said housing at a position generally opposing the aperture such that said first reflecting means is between the aperture and said second reflecting means, said second reflecting means positioned relative to the optical axis at a point forward from the focal point of said concave mirror;

a second housing structure affixed to said first housing structure and extending generally perpendicular to the optical axis, said second housing structure surrounding the aperture in said first housing structure at their point of juncture;

a source of radiation in said second housing structure disposed to direct a beam of radiation through the aperture; and radiation directing means disposed in said second housing structure between said source and the aperture;

said directing means having one position in which it does not intercept the beam in which case the beam impinges upon said first reflecting means and is thereby reflected along the optical axis in a direction opposite to said mirrors, a second position in which said directing means intercepts the beam and directs a portion thereof to said first reflecting means to furnish radiation along the optical axis and directs the rest of the beam to said second reflecting means which reflects the radiation to a point on the optical axis and thereby provide side-illumination, and a third position in which the directing means intercepts the beam and directs it all to said second reflecting means.

References Cited in the file of this patent

UNITED STATES PATENTS

| | | |
|---|---|---|
| 1,631,329 | Patterson | June 7, 1927 |
| 1,889,456 | Tillyer | Nov. 29, 1932 |
| 1,896,861 | Cameron | Feb. 7, 1933 |
| 2,014,888 | Forshey | Sept. 17, 1935 |
| 2,571,743 | Meyer | Oct. 16, 1951 |
| 2,633,122 | Vannas | Mar. 31, 1953 |
| 2,661,658 | Dyson | Dec. 8, 1953 |
| 2,703,506 | Kelly | Mar. 8, 1955 |
| 2,798,961 | Wormser | July 9, 1957 |
| 2,848,626 | Brackmann | Aug. 19, 1958 |